(12) United States Patent
Wiens et al.

(10) Patent No.: US 6,915,396 B2
(45) Date of Patent: Jul. 5, 2005

(54) FAST PRIORITY DETERMINATION CIRCUIT WITH ROTATING PRIORITY

(75) Inventors: Duane A Wiens, Fort Collins, CO (US); Robert F. Krick, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 862 days.

(21) Appl. No.: 09/853,738

(22) Filed: May 10, 2001

(65) Prior Publication Data

US 2002/0188821 A1 Dec. 12, 2002

(51) Int. Cl.[7] ............................................. G06F 12/00
(52) U.S. Cl. ...................... 711/158; 711/212; 711/220; 710/40; 710/107
(58) Field of Search ......................... 711/212–220, 130, 711/141, 146, 151, 158; 710/107, 4, 40, 111–114, 244, 264

(56) References Cited

U.S. PATENT DOCUMENTS

| | | | | |
|---|---|---|---|---|
| 4,794,521 A | * | 12/1988 | Ziegler et al. ............... | 711/130 |
| 5,870,625 A | * | 2/1999 | Chan et al. ..................... | 710/5 |
| 5,948,081 A | * | 9/1999 | Foster .......................... | 710/40 |
| 6,757,768 | * | 6/2004 | Potter et al. ................. | 710/112 |

OTHER PUBLICATIONS

De Blasi, "Computer Architecture," ISBN 0–201–41603–4 (Addison–Wesley, 1990), pp. 273–291.
Stone, "High Performance Computer Architecture," ISBN 0–201–51377–3 (Addison–Wesley,2d Ed. 1990), pp. 29–39.
Tabak, "Advanced Microprocessors, " ISBN 0–07–062807–6 (McGraw–Hill, 1991) pp. 244–248.
M. Papamarcos and J. Patel, "A Low Overhead Coherent Solution for Microprocessors with Private Cache Memories," in Proceedings of the 11th International Symposium on Computer Architecture, IEEE, New York (1984), pp. 348–354.

* cited by examiner

Primary Examiner—Nasser Moazzami

(57) ABSTRACT

The invention describes a system for and a method of creating and using dependencies to determine the order of servicing transaction requests in a multiple queue environment. When more than one outstanding transaction affects the same memory location, dependencies are established to ensure the correct sequencing of the competing transactions. In a preferred embodiment the dependency is configured to ensure that, as each request is inserted, other outstanding requests are checked to determine if the same memory location is accessed. If the same memory location is affected, a dependency is created which ensures the youngest queue entry which is present at the time the check is made occurs before the present outstanding request.

18 Claims, 6 Drawing Sheets

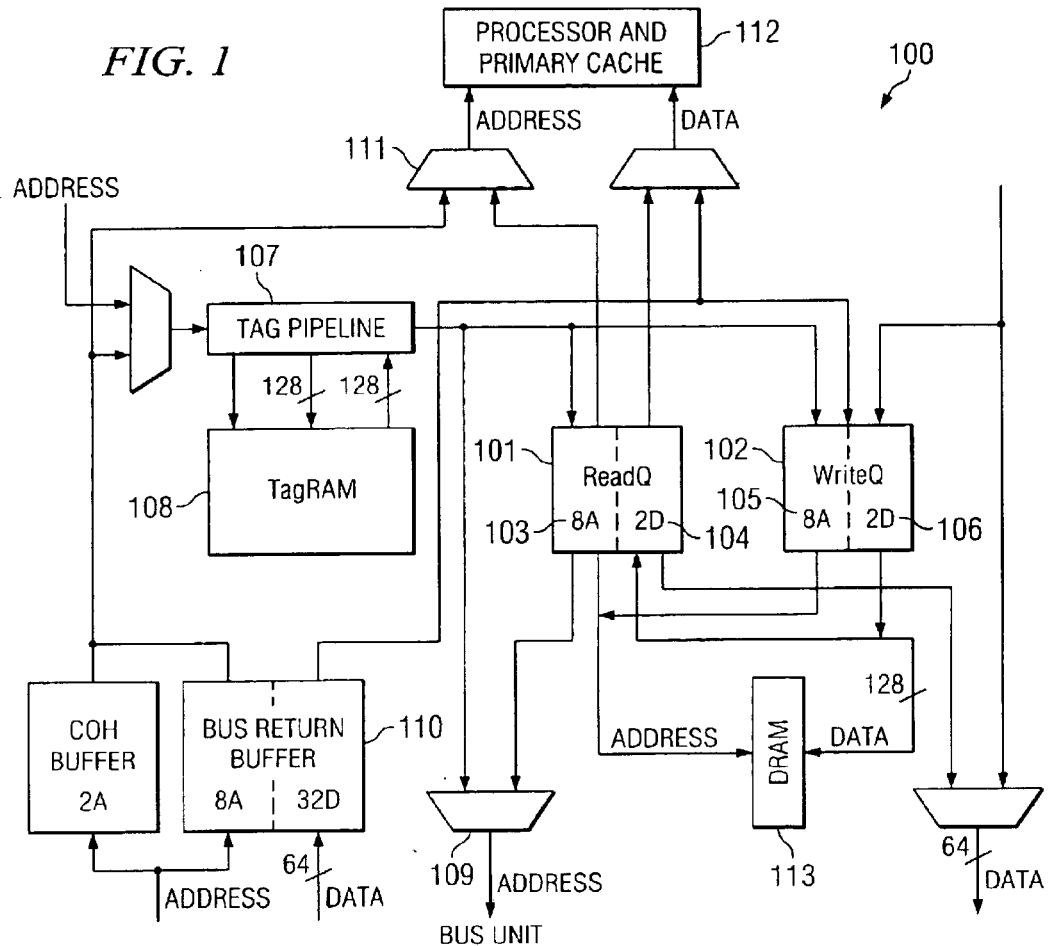

*FIG. 7B*
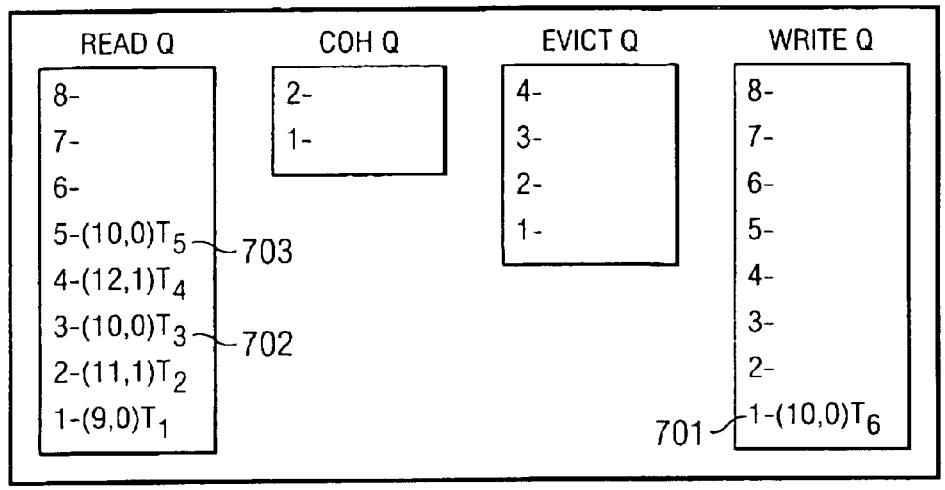
*FIG. 7C*
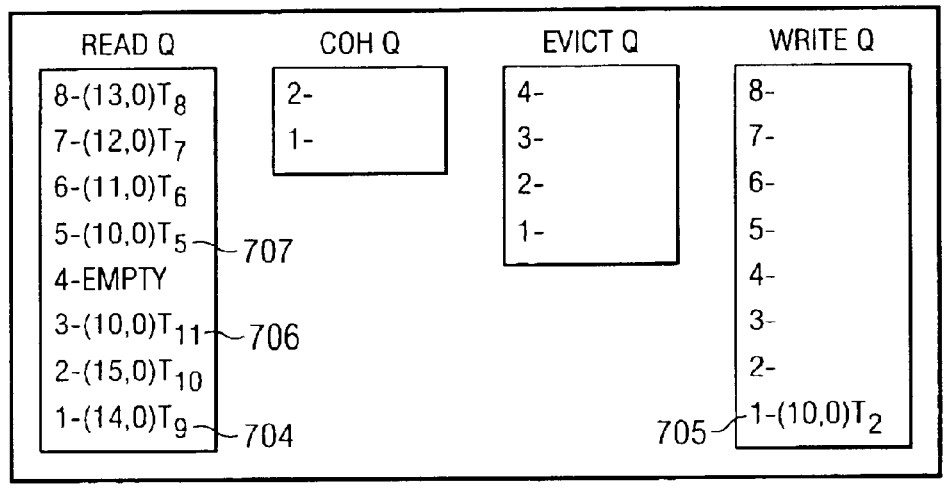
*FIG. 9*
| | | | |
|---|---|---|---|
| 900 → | ORIGINAL MATCH BITS | 0001 | 0100 |
| | COUNTER VALUE = 3 | | |
| 902 → | RIGHT SHIFTED BITS | 1000 | 0010 |
| 903 → | CLEAR MASK | 0111 | 1111 |
| 904 → | APPLIED MASK | 1000 | 0000 |
| | REVERSE SHIFT | 0000 | 0100 |
901

FIG. 10
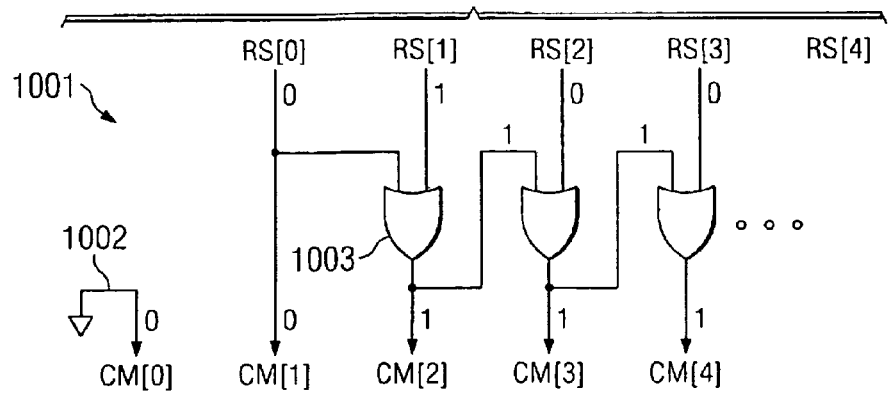
FIG. 11
| | | | | |
|---|---|---|---|---|
| 900 → ORIGINAL MATCH BITS | 0001 | 0100 | | | ← 1100
| COUNTER VALUE = 3 | | | | |
| 1101 → DUPLICATE MATCH BITS | 0001 | 0100 | 0001 | 0100 |
| 1102 → COUNTER MASK | 0000 | 1111 | 1111 | 0000 |
| 1103 → MASKED MATCH BITS | 0000 | 0100 | 0001 | 0000 |
| 1104 → CLEAR MASK | 0000 | 0011 | 1111 | XXXX |
| 1105 → APPLIED MASK | 0000 | 0100 | 0000 | 0000 |
| ANSWER | 0000 | 0100 | | |
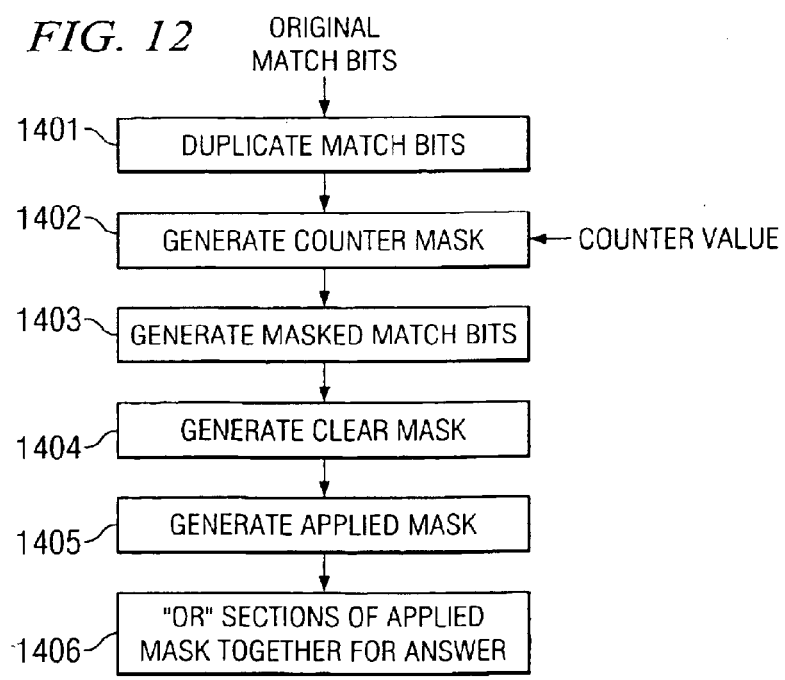
FIG. 12

FAST PRIORITY DETERMINATION CIRCUIT WITH ROTATING PRIORITY

This present application is related to concurrently filed, commonly assigned U.S. patent application Ser. No. 09/853,951, entitled "SYSTEM OF AND METHOD FOR MEMORY ARBITRATION USING MULTIPLE QUEUES," abandoned, the disclosure of which is hereby incorporated herein by reference.

BACKGROUND

It has become more desirable to increase the speed with which computers process information. One scheme for increasing processing speed includes improving memory access time.

A common manner in which to improve memory access time is to provide a cache memory along with a main memory. A cache memory is typically associated with a processor, and requires less access time than the main memory. Copies of data from reads and writes from the processor are retained in the cache. Some cache systems retain recent reads and writes, while others may have more complex algorithms to determine which data is retained in the cache memory. When a processor requests a data which is currently resident in the cache, only the cache memory is accessed. Since the cache memory requires less access time than the main memory, processing speed is improved. Today, memory accesses from the main memory may take as long as 250 nanoseconds while cache access may take two or three nanoseconds.

Additionally, a cache system may be used to increase the effective speed of a data write. For example, if a processor is to write to a storage location, the processor may perform a data write only to the cache memory. The cache memory and associated control logic may then write the data to the main memory while the processor proceeds with other tasks.

Computer systems may also extend the use of cache and may employ a multilevel hierarchy of cache memory, with relatively fast, expensive, limited-capacity memory at the highest level of the hierarchy and proceeding to relatively slower, lower cost, higher-capacity memory at the lowest level of the hierarchy. Typically, the hierarchy includes a small fast memory called a primary cache, either physically integrated within a processor integrated circuit or mounted physically close to the processor. Primary cache incorporated on the same chip as the Central Processing Unit (CPU) may have a frequency (i.e., access time) equal to the frequency of the CPU. There may be separate instruction primary cache and data primary cache. Primary caches typically maximize performance while sacrificing capacity so as to minimize data latency. In addition, primary cache typically provides high bandwidth. Secondary cache or tertiary cache may also be used and is typically located further from the processor. These secondary and tertiary caches provide a "backstop" to the primary cache and generally have larger capacity, higher latency, and lower bandwidth than primary cache. If a processor requests an item from a primary cache and the item is present in the primary cache, a cache "hit" results. While, if an item is not present, there is a primary cache "miss." In the event of a primary cache miss, the requested item is retrieved from the next level of the cache memory or, if the requested item is not contained in cache memory, from the main memory.

Typically, all memories are organized into words (for example, 32 bits or 64 bits per word). The minimum amount of memory that can be transferred between a cache and a next lower level of the memory hierarchy is called a cache line, or sometimes a block. A cache line is typically multiple words (for example, 16 words per line). Memory may also be divided into pages (also called segments), with many lines per page. In some systems, page size may be variable.

Caches have been constructed using three principal architectures: direct-mapped, set-associative, and fully-associative. Details of the three cache types are described in the following prior art references, the disclosure of which are hereby incorporated herein by reference: De Blasi, "Computer Architecture," ISBN 0-201-41603-4 (Addison-Wesley, 1990), pp. 273–291; Stone, "High Performance Computer Architecture," ISBN 0-201-51377-3 (Addison-Wesley, 2d Ed. 1990), pp. 29–39; Tabak, "Advanced Microprocessors," ISBN 0-07-062807-6 (McGraw-Hill, 1991) pp. 244–248.

With direct mapping, when a line is requested, only one line in the cache has matching index bits. Therefore, the data can be retrieved immediately and driven onto a data bus before the system determines whether the rest of the address matches. The data may or may not be valid, but in the usual case where it is valid, the data bits are available on a bus before the system confirms validity of the data.

With set-associative caches, it is not known which line corresponds to an address until the index address is computed and the tag address is read and compared. That is, in set-associative caches, the result of a tag comparison is used to select which line of data bits within a set of lines is presented to the processor.

A cache is said to be fully associative when a cache stores an entire line address along with the data and any line can be placed anywhere in the cache. However, for a large cache in which any line can be placed anywhere, substantial hardware is required to rapidly determine if and where an entry is in the cache. For large caches, a faster, space saving alternative is to use a subset of an address (called an index) to designate a line position within the cache, and then store the remaining set of more significant bits of each physical address (called a tag) along with the data. In a cache with indexing, an item with a particular address can be placed only within a set of cache lines designated by the index. If the cache is arranged so that the index for a given address maps to exactly one line in the subset, the cache is said to be direct mapped. If the index maps to more than one line in the subset, the cache is said to be set-associative. All or part of an address is hashed to provide a set index which partitions the address space into sets.

In all three types of caches, an input address is applied to comparison logic. Typically a subset of the address, called tag bits, are extracted from the input address and compared to tag bits of each cache entry. If the tag bits match, corresponding data is extracted from the cache.

In general, direct-mapped caches provide fastest access but requires the most time for comparing tag bits. Fully-associative caches have greater access time but consume higher power and require more complex circuitry.

When multiple processors with their own caches are included in a system, cache coherency protocols are used to maintain coherency between and among the caches. There are two classes of cache coherency protocols:

1. Directory based: The information about one block of physical memory is maintained in a single, common location. This information usually includes which cache(s) has a copy of the block and whether that copy is marked exclusive for future modification. An access to a particular block first queries the directory to see if the memory data is stale and the real data resides in some other cache (if at all). If it is, then the cache containing the modified block is forced to return its data to memory. Then the memory forwards the data to the new requester, updating the directory with the new location of that block. This protocol minimizes interbus module (or inter-cache) disturbance, but typically suffers from high latency and is expensive to build due to the large directory size required.

2. Snooping: Every cache that has a copy of the data from a block of physical memory also has a copy of the information about the data block. Each cache is typically located on a shared memory bus, and all cache controllers monitor or snoop on the bus to determine whether or not they have a copy of the shared block.

Snooping protocols are well suited for multiprocessor system architecture that use caches and shared memory because they operate in the context of the preexisting physical connection usually provided between the bus and the memory. Snooping is often preferred over directory protocols because the amount of coherency information is proportional to the number of blocks in a cache, rather than the number of blocks in main memory.

The coherency problem arises in a multiprocessor architecture when a processor must have exclusive access to write a block of memory or object, and/or must have the most recent copy when reading an object. A snooping protocol must locate all caches that share the object to be written. The consequences of a write to shared data are either to invalidate all other copies of the data, or to broadcast the write to all of the shared copies. Because of the use of write back caches, coherency protocols must also cause checks on all caches during memory reads to determine which processor has the most up to date copy of the information.

Data concerning information that is shared among the processors is added to status bits that are provided in a cache block to implement snooping protocols. This information is used when monitoring bus activities. On a read miss, all caches check to see if they have a copy of the requested block of information and take the appropriate action, such as supplying the information to the cache that missed. Similarly, on a write, all caches check to see if they have a copy of the data, and then act, for example by invalidating their copy of the data, or by changing their copy of the data to reflect the most recent value.

Snooping Protocols are of Two Types:

Write invalidate: The writing processor causes all copies in other caches to be invalidated before changing its local copy. The processor is then free to update the data until such time as another processor asks for the data. The writing processor issues an invalidation signal over the bus, and all caches check to see if they have a copy of the data. If so, they must invalidate the block containing the data. This scheme allows multiple readers but only a single writer.

Write broadcast: Rather than invalidate every block that is shared, the writing processor broadcasts the new data over the bus. All copies are then updated with the new value. This scheme continuously broadcasts writes to shared data, while the write invalidate scheme discussed above deletes all other copies so that there is only one local copy for subsequent writes. Write broadcast protocols usually allow data to be tagged as shared (broadcast), or the data may be tagged as private (local). For further information on coherency, see J. Hennessy, D. Patterson, Computer Architecture: A Quantitative Approach, Morgan Kaufmann Publishers, Inc. (1990), the disclosure of which is hereby incorporated herein by reference.

In a snooping coherence multiprocessor system architecture, each coherent transaction on the system bus is forwarded to each processor's cache subsystem to perform a coherency check. This check usually disturbs the processor's pipeline because the cache cannot be accessed by the processor while the coherency check is taking place.

In a traditional, single ported cache without duplicate cache tags, the processor pipeline is stalled on cache access instructions when the cache controller is busy processing cache coherency checks for other processors. For each snoop, the cache controller must first check the cache tags for the snoop address, and then modify the cache state if there is a hit.

Allocating cache bandwidth for an atomic (unseparable) tag read and write (for possible modification) locks the cache from the processor longer than needed if the snoop does not require a tag write. For example, 80% to 90% of the cache queries are misses, i.e. a tag write is not required. In a multi-level cache hierarchy, many of these misses may be filtered if the inclusion property is obeyed. An inclusion property allows information to be stored in the highest level of cache concerning the contents of the lower cache levels.

The speed at which computers process information for many applications, can also be increased by increasing the size of the caches, especially the primary cache. As the size of the primary cache increases, main memory accesses are reduced and the overall processing speed increases. Similarly, as the size of the secondary cache increases, the main memory accesses are reduced and the overall processing speed is increased, though not as effectively as increasing the size of the primary cache.

Typically, in computer systems, primary caches, secondary caches and tertiary caches are implemented using Static Random Access Memory (SRAM). The use of SRAM allows reduced access time which increases the speed at which information can be processed. Dynamic Random Access Memory (DRAM) is typically used for the main memory as it is less expensive, requires less power, and provides greater storage densities.

Typically prior art computer systems also limited the number of outstanding transactions to the cache at a given time. If more than one transaction were received by a cache, the cache would process the requests serially. For instance, if two transactions were received by a cache, the first transaction request received would be processed first with the second transaction held until the first transaction was completed. Once the first transaction was completed the cache would process the second transaction request.

Numerous protocols exist which maintain cache coherency across multiple caches and main memory. One such protocol is Modified, Exclusive, Shared, Invalid (MESI). MESI protocol, which is described in detail in M. Papamarcos and J. Patel, "A Low Overhead Coherent Solution for Multiprocessors with Private Cache Memories," in Proceedings of the 11$^{th}$ International Symposium on Computer Architecture, IEEE, New York (1984), pp. 348–354, the disclosure of which is hereby incorporated herein by reference. Under the MESI protocol, a cache line is categorized according to its use. A modified cache line indicates that the particular line has been written to by the cache that is the current owner of the line. An exclusive cache line indicates that a cache has exclusive ownership of the cache line, which will allow the cache controller to modify the cache line. A shared cache line indicates that one or more caches have ownership of the line. A shared cache line is considered read only and any device under the cache may read the line but is not permitted to write to the cache. A cache line with no owner identifies a cache line whose data may not be valid since the cache no longer owns the cache line.

SUMMARY OF THE INVENTION

The invention describes a system for and a method of creating and using dependencies to determine the order of servicing transaction requests in a multiple queue environment. When more than one outstanding transaction affects the same memory location, dependencies are established to ensure the correct sequencing of the competing transactions. In a preferred embodiment the dependency is configures to ensure that, as each request is processed, other outstanding requests are checked to determine if the same memory location is affected. If the same memory location is affected, a dependency is created which ensures the youngest queue entry which is present at the time the check is made occurs before the present outstanding request.

BRIEF DESCRIPTION OF THE DRAWINGS

FIG. 1 shows secondary cache structure which includes two queues, a read queue and a write queue;

FIG. 2 shows a two dimensional array which represents the set associate cache contained in DRAM;

FIG. 7B shows an example of a dependency selection when multiple address dependencies exist;

FIG. 7C shows an example of the wraparound nature of the queues;

FIG. 9 is a diagram of a method to instantiate a dependency between a read operation and a write operation;

FIG. 10 is a schematic diagram of logic circuitry which implements the clear mask of FIG. 9;

FIG. 11 is a diagram of an example of an embodiment of the present invention; and FIG. 12 is a flow chart depicting the generation of a dependency.

DETAILED DESCRIPTION

Figure 3:
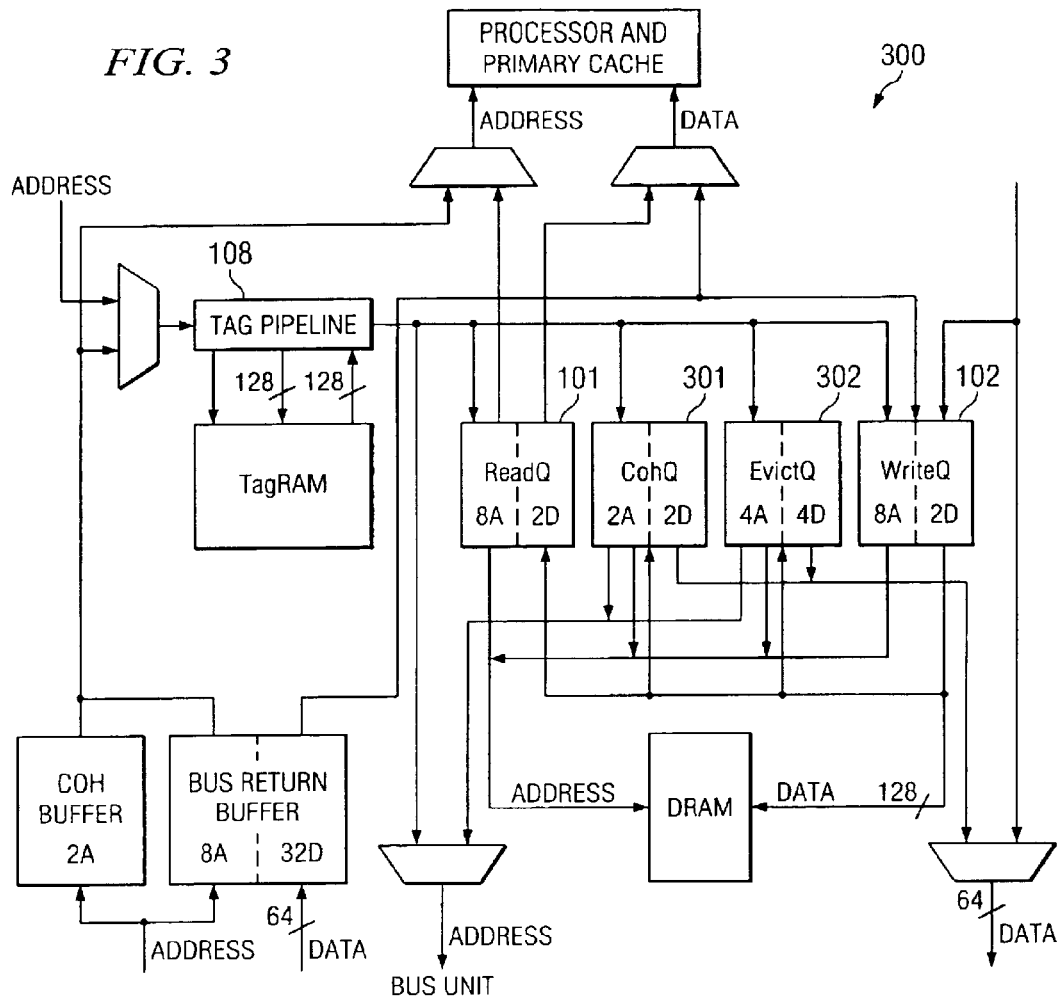
FIG. 3 is a secondary cache structure which includes a read queue, a write queue, a coherency queue, and an evict queue which are each used to read cache lines from the DRAM.

Generally, a memory hierarchy includes various components which operate at various speeds. These speeds may differ from the speed of the Central Processing Unit (CPU). Typically, as the distance from the CPU increases, the speed of the component decreases. These speed mismatches may be solved by queuing, or storing, the delayed operations. For example, Static Random Access Memory (SRAM) is used in cache operations and, Dynamic Random Access Memory (DRAM) technology has generally not been used for caches because it offers little benefit, in terms of access time, relative to the main memory. However, DRAM technology is approximately four times less expensive per bit of storage than SRAM and, because of its higher density, allows a much larger cache to be implemented for a given area. When "on package" real estate is critical, the density advantage of DRAM verses SRAM also becomes critical.

As the size of the SRAM implemented primary cache increases, the size of the memory required for the secondary or tertiary cache also increases. Typically when a cache hierarchy is implemented, the size of the memory at each succeeding level is increased by a factor of four or eight. Therefore, for a primary cache of one megabyte, a secondary cache of four to eight megabytes is desirable. As the size of the secondary cache increased, the use of SRAM became prohibitive because of its limited density. By using DRAM technology secondary caches of thirty two megabytes, or more, are possible. While time to access information stored in DRAM secondary cache increases, the overall affect is offset by the low primary cache miss rate associated with the larger primary cache. In other words, as the size of the primary cache increases, the secondary cache could include a longer latency.

To further reduce the latency associated with the secondary cache, the DRAM memory can be designed to include a faster access time. This faster access time is accomplished by using smaller DRAM chips than in main memory, increasing the number of pins used to transfer data to and from the DRAM, and increasing the frequency with which the DRAM chip operates. DRAM chips can be configured to allow a cache line to be transferred in the order of 15 nanoseconds.

Both the increased size of the secondary cache and its longer latency period (as compared to the primary cache) require a methodology to deal with multiple unfulfilled requests for data from the secondary cache. Requests may be received as fast as every two nanoseconds, and if it takes 15 nanoseconds for a request to be serviced, multiple additional requests may be received. While prior art systems have handled numerous requests to SRAM secondary cache sequentially, the use of larger DRAM secondary cache structures requires a more robust approach.

FIG. 1 shows secondary cache structure 100 which includes two queues, Read queue (ReadQ) 101 and Write queue (WriteQ) 102. For purpose of the present illustration, ReadQ 101 can hold eight addresses 103 and two lines of data 104 while WriteQ 102 can hold eight addresses 105 and eight lines of data 106. Address 103 and address 105 are buffered copies of the address of the cache line which will be stored in DRAM 113, not the cache line itself. When a read request is received by the secondary cache, it is processed by Tag Pipeline 107, which determines the location of the cache line in DRAM 113. The read request is stored in one of the address locations, and while the read is taking place, additional read requests can be received by ReadQ 101. Simultaneously, write requests can be received, processed by Tag Pipeline 107 and stored by WriteQ 102. The storage of multiple requests allows the caches to operate as non-blocking caches which allow the system to continue to operate with one or more unfulfilled transactions pending. A memory arbitrator, or a memory-access ordering apparatus, as described below, is used to determine the sequence of multiple pending requests.

Tag Pipeline 107 and TagRAM 108 are used to determine whether the requested cache line is resident in the secondary cache. Tag Pipeline 107 is also operative to make room for a new cache line to be written into the secondary cache. If the cache line is resident in the secondary cache, the request is sent by Tag Pipeline 107 to ReadQ 101 which then acts on the request. ReadQ 101 then supplies the cache line to the CPU. If the cache line is not resident, the request is sent by Tag Pipeline 107 to main memory via Multiplexer 109. Cache lines returning from the main memory pass through Bus Return Buffer 110 and are sent via Multiplexer 111 to processor 112. These cache lines returning from main memory can also be stored in the secondary cache to reduce access time for subsequent retrievals of the same cache line. Tag Pipeline 107 and TagRAM 108 treat operations from the CPU atomically and sequentially. This hides the queuing behavior which is necessary to provide the data.

WriteQ 102 is responsible for writing new cache lines into the DRAM of the secondary cache. These cache lines are obtained from the processor or the main memory. The processor may send the cache line back to the secondary cache when it has updated the information contained in the cache line or the cache line may be sent to the secondary cache to remove the data from the primary cache. Cache lines coming from the primary cache are typically in the modified or "dirty" state. Storing the modified cache line in the secondary cache rather than the main memory allows a quicker subsequent retrieval of the cache line. Cache lines coming from the main memory pass through Bus Return Buffer 110, to WriteQ 102 and are stored in DRAM 113.

The size of DRAM 113 in a preferred embodiment is thirty-two megabytes. DRAM 113 can therefore store 262,144 cache lines where the size of each cache line is 128 bytes. In a preferred embodiment, DRAM 113 uses a four way set associate cache which contains 65,536 rows. The four way (0, 1, 2, 3) set associate cache therefore allows the storage of 262,144 cache lines. The set associate cache can be represented as a two dimensional array.

One of ordinary skill in the art would appreciate that, while the present description discusses a single processor requesting a cache line, the invention would be equally applicable to a number of processors which share the secondary cache.

FIG. 2 shows a two dimensional array which represents the set associate cache contained in DRAM 113. The two dimensional array contains 65,536 indexes or rows and 4 ways (0, 1, 2, 3). When a cache line is sent to the secondary cache, Tag Pipeline 107 applies a function to the address to determine where in DRAM 113 the cache line should be stored. The function first determines which index the cache line should be stored in. Sixteen bits of the cache line address are used to determine the index. Next the cache line way is determined using the next two bits of the function. For example a cache line with the output of the function on the address 000000000000000110 would be stored in index 1 (0000000000000001) and way 2 (10). The cache line would be stored in space 201 of FIG. 2. Forty four bits are used in the main memory to address individual bytes where the upper 32 bits are used to differentiate the cache lines. Since only eighteen bits of the cache line address is used to determine where in DRAM 113 the cache line will be stored, more than one cache line may be stored in the same portion of DRAM 113, but preferably not simultaneously.

TagRAM 108 (FIG. 1) also contains 65,536 rows (indices) and 4 columns (ways) and is used to determine the location of a cache line in DRAM 113. When a request is received from the primary cache, Tag Pipeline 107 calculates an index used to access TagRAM 108. In a preferred embodiment, forty four bits (0 through 43) are used to address main memory, with 0 being the most significant bit and 43 being the least significant bit. Since cache lines contain 128 bytes the lower seven bits (37 through 43) are not used and can be dropped. Sixteen of the remaining bits (21 through 36) are used by Tag Pipeline 107 to calculate the index for both TagRAM 108 as well as DRAM 113. The remaining bits, bits 0 through 20, referred to as the "tag", are stored in the appropriate portion of TagRAM 108. The bits stored in TagRAM 108, as well as the location as to where the bits are stored, are used by Tag Pipeline 107 to determine if the desired cache line is present in the secondary cache. In this embodiment, each of the four ways are checked to determine if the cache line is present in the secondary cache.

FIG. 3 is a secondary cache structure which includes ReadQ 101, WriteQ 102, Coherency queue (CohQ) 301 and Evict queue (EvictQ) 302. ReadQ 101, CohQ 301 and EvictQ 302 are each used to read cache lines from the DRAM. In FIG. 3, ReadQ 101 is used to read the cache line from the DRAM and return the cache line back to the processor. A copy of the cache line may be retained in the secondary cache.

CohQ 301 is used to read the DRAM and send the data to another processor via the external memory bus. CohQ 301 is used to satisfy a snoop from another processor. The snoop takes the cache line from the secondary cache and releases the cache line to a second processor in response to the snoop. CohQ 301 is similar to a remote read queue from a second processor.

EvictQ 302 clears a cache line from the DRAM. Depending on the state of the cache line, EvictQ 302 may discard the data (for shared or private clean data) or EvictQ 302 will return a dirty private cache line to the main memory or to a requesting processor. In either case, EvictQ 302 makes room in the secondary cache for subsequent data. Typically EvictQ 302 flushes the oldest cache line from the secondary cache. As the cache line is flushed from memory, Tag Pipeline 107 and TagRAM 108 are updated to reflect the information data stored.

The system of FIG. 3 includes three separate specialized read queues in the form of ReadQ 101, CohQ 301, and EvictQ 302 because overall performance of the system is directly tied to the time required to service the reads from a processor. Both ReadQ 101 and CohQ 201 can, if the reads are not performed expediously, cause a processor to reduce its overall operating speed. EvictQ 302 is used to push old cache lines no longer needed back to main memory to allow for storage of additional cache lines. By devoting a separate queue to each of the reads, overall system performance is improved.

CohQ 301 of FIG. 3 can hold two addresses and two lines of data while EvictQ 302 can hold four addresses and can hold four lines of data. The number of addresses and the number of lines of data are a function of the performance desired from the secondary cache structure. As the number of addresses and the number of lines of data stored are increased, the overall performance of the system is increased.

The Queue architecture shown in FIG. 3 allows the incoming rate of transactions to temporarily exceed the rate at which the incoming transactions can be processed. In other words, there can be multiple requests outstanding at any given time. These outstanding requests are stored in the address queues of ReadQ 101, CohQ 301, EvictQ 302 and WriteQ 102. The separate distinct queues are used for the various transactions to give higher priority to more critical transactions. When multiple outstanding requests are present within a given queue, they are serviced in the order they were received. However, the outstanding requests within a given queue may not be serviced sequentially, as dependencies between queues may require an outstanding transaction in another queue to take priority over the servicing of the next outstanding request in the present queue. The dependencies are gathered within a dependency logic.

Figure 4:
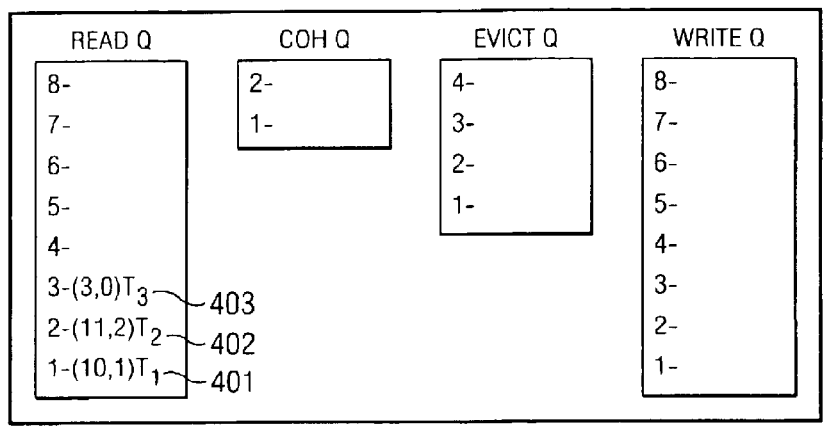
FIG. 4 shows the structure of the addresses for the various queues of FIG. 3.

FIG. 4 shows the structure of the addresses for the various queues of FIG. 3. Addresses stored in the addresses of the various queues are with respect to DRAM 113 and not to the cache line address from main memory. As described in FIG. 2, a memory address in DRAM 113 is identified by an index and a way, in which the index varies from 0 to 65,536 and the way varies from 0 to 3. For the purposes of FIGS. 4 through 7 DRAM 113 memory address will be identified by ordered pairs of the form (x, y) where x represents the index value and y represents the way value. For instance (5,3) would represent a cache line stored at an index value of 5 and way 3. As previously discussed, multiple outstanding requests present within a specific queue are processed in the order in which they were received. If a read for (10, 1) were received first, followed by read for (11, 2), followed by read for (3, 0), and each of the requests were outstanding, the ReadQ address 103 would appear as illustrated in FIG. 4. Without transactions pending in the other queues, read 401 would be serviced first, read 402 would be serviced next and finally read 403 would be processed last.

Figure 5:
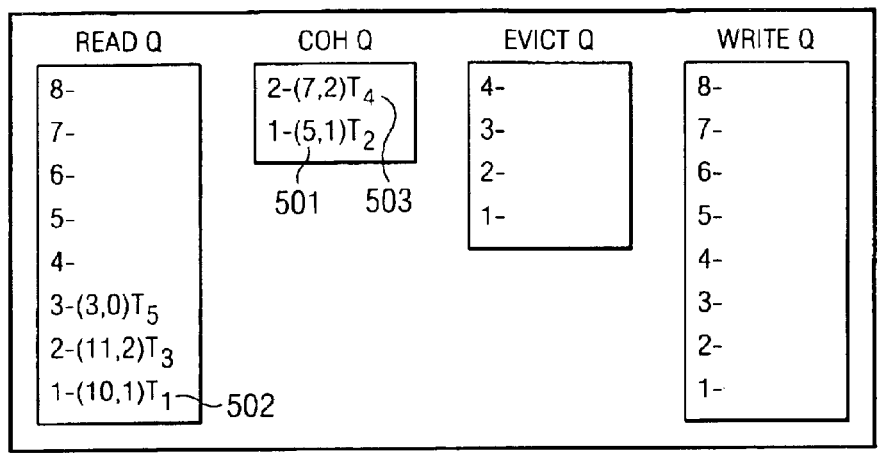
FIG. 5 shows the structure of the addresses when transactions are pending in the coherency queue and the read queue.

FIG. 5 shows the structure of the addresses when transactions are pending in the CohQ and the Read Q. The "T" designation indicates the time sequence at which the requests were received and processed by Tag Pipeline 107. In FIG. 5 at time T1 a read (10, 1) was received, followed by a Coherency (5, 1) at time T2, followed by a read (11, 2) at time T3, followed by a coherency (7,2) at time T4 followed by a read (3, 0) at time T5. Preferably, an outstanding coherency request takes priority over an outstanding request in any of the other three queues (ReadQ, EvictQ, or WriteQ). If each of the transactions identified in FIG. 5 were outstanding and have not begun, coherency (5, 1) 501 would be serviced before read (10, 1) 502 even though read (10, 1) 502 was received first. Additionally, since outstanding transactions in the coherency queue have priority over outstanding transactions in the other queues, outstanding coherency transaction (7, 2) 503 would also be serviced before read (10, 1) 502. Once each of the outstanding coherency transactions was serviced, the three outstanding read requests would be performed in sequence.

Figure 6:
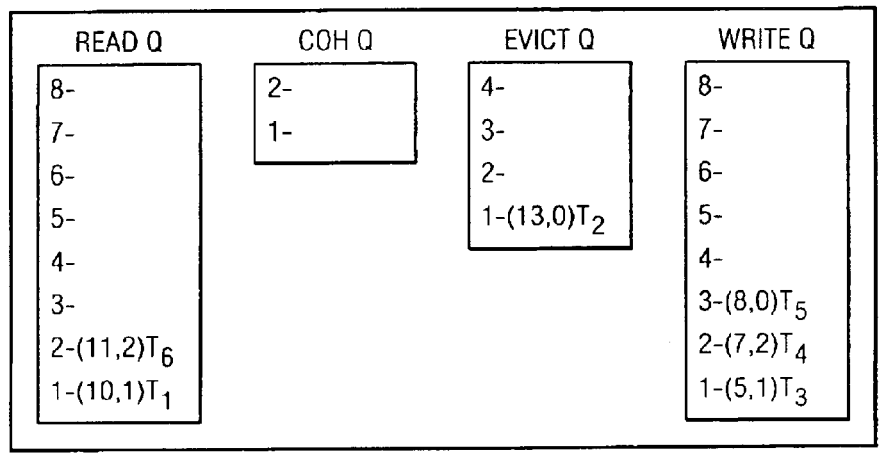
FIG. 6 shows the structure of the addresses when transactions are pending in the read queue, evict queue, and write queue.

FIG. 6 shows the structure of the addresses when transactions are pending in the ReadQ, EvictQ and WriteQ. In FIG. 6 at time T1 a read (10, 1) was received, followed by an Evict (13, 0) at time T2, followed by write (5, 1) at time T3, followed by a write (7, 2) at time T4, followed by a write (8, 0) at time T5, followed by a read (11, 2) at time T6.

Preferably, barring action on the identical portion of DRAM 113, a read takes priority over a write. If each of the transactions identified in FIG. 6 were outstanding, read (10, 1) would occur first, followed by read (11, 2). Since Evict is a specific type of read, Evict (13, 0) would occur third followed by the three write requests in sequence.

Figure 7A:
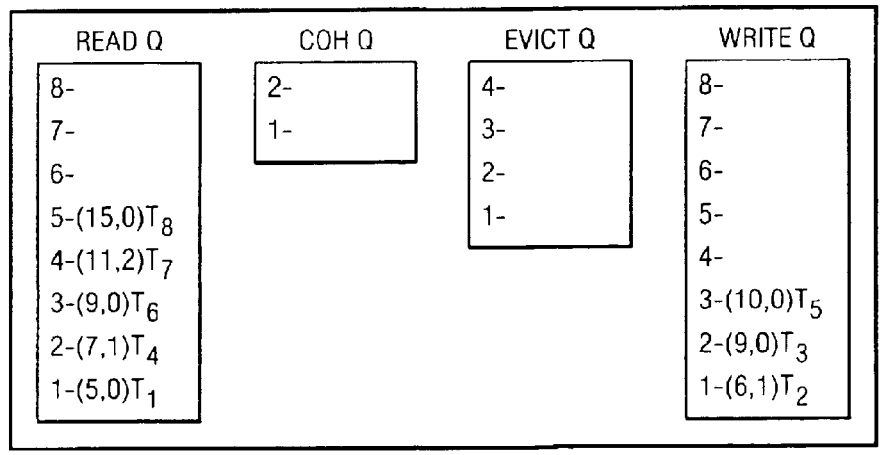
FIG. 7A shows the structure of the addresses when transactions are pending in the read queue and the write queue and the same memory portion of DRAM is affected.

FIG. 7A shows the structure of the addresses when transactions are pending in the ReadQ and the WriteQ and the same memory portion of DRAM 113 is affected. In FIG. 7A at time T1 a read (5, 0) was received, followed by a write (6, 1) at time T2, followed by a write (9, 0) at time T3, followed by a read (7, 1) at time T4, followed by a write (10, 0) at time T5, read (9, 0) at time T6, followed by a read (11, 2) at time T7, followed by a read (15, 0) at time T8. As described with respect to FIG. 5, preferably, reads occur before writes as long as there is no conflict, i.e., the operations do not involve the same DRAM 113 memory location. However, when the same DRAM 113 memory location is affected, the operation which was requested first on that memory location must occur before the operation which was requested second is performed on that memory location. In other words, with respect to FIG. 7A, the write (9, 0) which occurred at time T3, must occur before the read (9, 0) which occurred at time T5 takes place. This sequencing is accomplished by checking for possible dependencies when a transaction is requested and, if a dependency is identified, ensuring the dependent transaction is accomplished prior to the transaction which caused the dependency.

At time T1 when the read (5, 0) was received, there were no outstanding transactions in any of the queues, so no dependency was identified. At time T2 when write (6, 1) was received, there were no other transactions which affected DRAM 113 memory location (6, 1) so no dependencies were identified. Similarly, at time T3 when write (9, 0) was received, each outstanding transaction was checked and no dependencies were identified because no outstanding transaction affected DRAM 113 memory location (9, 0). At time T4 read (7, 1) was received and again no dependency was identified. At time T5 write (10, 0) is requested, which again, does not conflict with any outstanding transactions. However, at time T6, when the request from Tag Pipeline 107 is checked for dependencies, the write (9, 0) will be identified and a dependency will be established which will require that the most recent entry in the write Q, which involves the dependency, will have to be completed before the read (9, 0) is serviced. In this example, read (5, 0) will be serviced first, followed by read (7, 1) followed by write (6, 1), followed by write (9, 0) followed by write (10, 0), followed by read (9, 0), followed by read (11, 2) followed by read (15, 0). By servicing the write (9, 0) before the read (9, 0) the system ensures the latest cache line for (9, 0) is being received by the read (9, 0) transaction.

FIG. 7B shows an example of dependency selection when multiple address dependencies exist. In this example, assume transactions T1, T2, T3, T4 and T5 are waiting in the read Q when at time T6, a write of (10, 0) is inserted in the write Q. When (10, 0) write 701 is inserted in the write Q slot 1, it's address is compared against all the valid entries in the read Q. Sslots 3 702 and 5 703 both match, so dependencies exist in that read Q slot 3 702 must execute before write Q slot 1 701, and read Q slot 5 703 must execute before write Q slot 1 701. However, the system does not need to keep track of both of these dependencies. It is sufficient to only record the dependency to the "youngest" read which is involved with the dependency, since there is an implicit priority within the read Q to always process the oldest transaction first. Read Q slot 3 702 must execute before read Q slot 5 703. Therefore, if write Q slot 1 701 only records a dependency to read Q slot 5 703 then the dependency on read Q slot 3 702 is implicitly satisfied.

FIG. 7C shows an example designed to highlight the rotating or wraparound nature of the Q structures and to show how dependency checking is impacted. For this example, assume that transactions at times T1, T2, T3, T4, T5, T6, T7 and T8 were all reads and were held in read Q slots 1–8 respectively. Then the transactions held in read Q slots 1–4 completed, and were removed from the read Q. The next read transaction will be placed in read Q slot 1 704, shown as (14, 0) T9. Note that the transaction T9 in slot 1 is still "younger" than the transactions in slots 5–8. Additional read requests T10 and T11 are then put in read Q slots 2 and 3. The slot where a new transaction is placed is controlled by the read Q insertion pointer. This is a rotating pointer in the sense that after inserting a transaction into slot 8, the pointer wraps around and points to slot 1 for the next insertion. As a result, the priority or "age" of a transaction is dependent both on its slot number and on the value of the read Q insertion pointer.

Continuing the example, a write to (10, 0) 705 arrives at time T12. When the write (10, 2) T12 is entered into the write Q slot 1 705, it's address is compared against the address of the read Q entries to find dependencies. In this case, slot 3 706 and slot 5 707 have address matches, so a dependency exists between read Q slot 3 706 and write Q slot 1 705, and a dependency exists between read Q slot 5 707 and write Q slot 1 705. Note that these are the same dependencies that existed in FIG. 7B, but because of the rotating nature of the read Q, the entry in slot 3 706 is now the youngest. So the entry in write Q slot 1 705 marks itself as dependent on read Q slot 3 706. The dependency on read Q slot 5 707 is implicitly handled by the fact that the read Q must execute its slot 5 707 before slot 3 706. One of ordinary skill in the art would understand the invention includes other combinations of address slots and numbering schemes.

Figure 8:
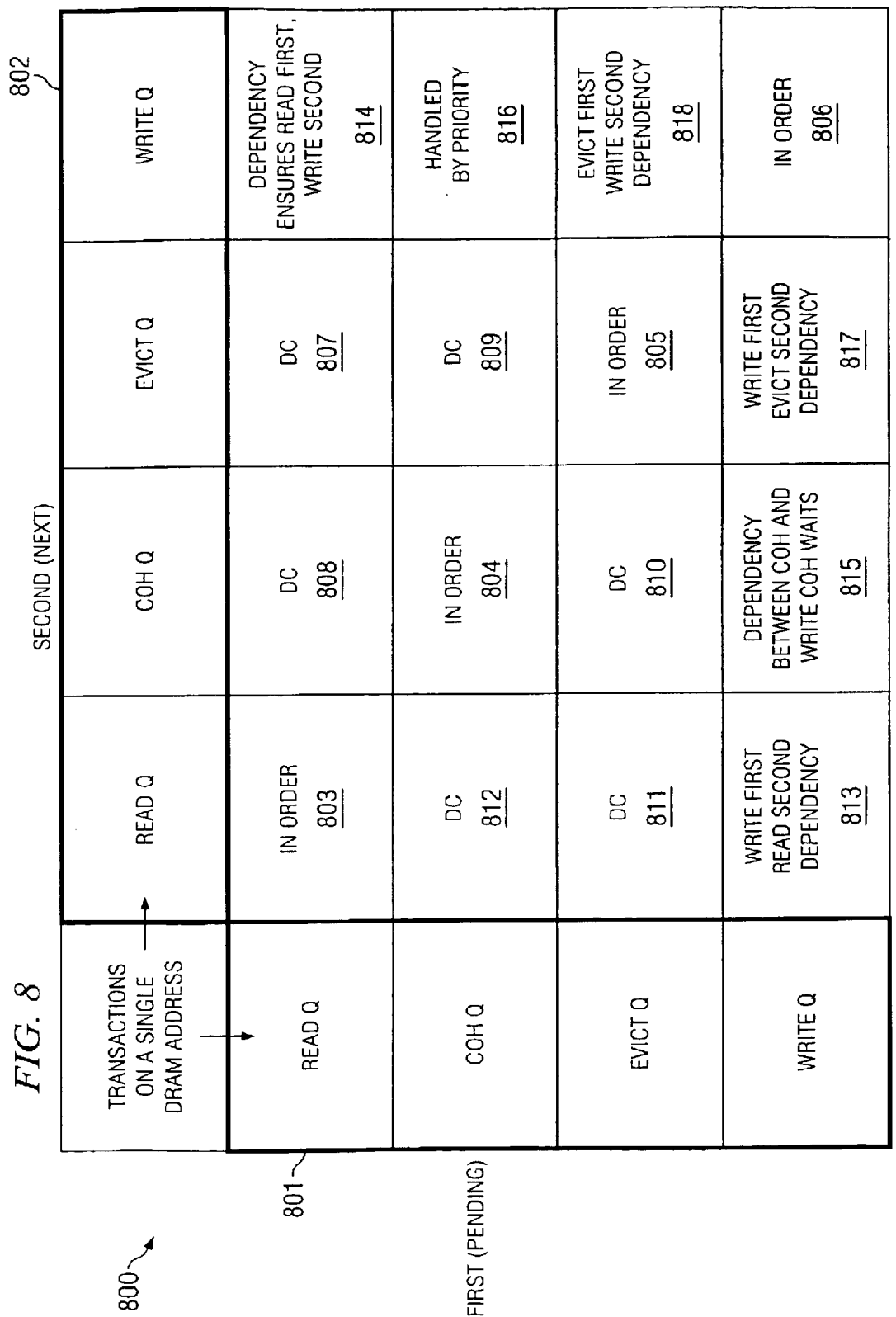
FIG. 8 is a chart illustrating the dependencies between the various queues.

FIG. 8 is a chart showing the dependency logic priorities between the various queues. Column 801 identifies a queue which receives the first outstanding request. Row 802 identifies the queue which receives the second outstanding request for an operation or transaction on the same memory address. The contents of the table indicate the resulting dependencies. Diagonal cells 803, 804, 805 and 806 describe two outstanding transactions in the same queue. As previously described when two outstanding requests are contained in the same queue, the requested transactions are performed in the order in which received. Cells 807, 808, 809, 810, 811 and 812 are situations in which a first pending transaction involves a read and a second pending transaction also involves a read. Since reads are not destructive, these cells are labeled as don't cares (DC), i.e., the transactions may be conducted in any order. However, as previously described, an outstanding transaction in a coherency queue will always be serviced first through a priority and therefore a dependency is not necessary.

As illustrated in FIG. 8, cell 813 describes the dependency required when a write to a specific DRAM 113 memory location occurs before a read to the same DRAM 113 memory location. In this case, the write should occur prior to the read. The dependency is handled by ensuring that the most recent matching outstanding transaction in the write queue (when the read request was received) is serviced prior to servicing an outstanding entry in the read queue. Other dependency algorithms can be implemented similarly.

Cell 814 of FIG. 8 shows the reversed situation. Therein, a matching transaction to read a specific DRAM 113 memory address is received before an outstanding transaction to write to the same specific DRAM 113 memory address. In this case, a dependency is established which will ensure that the read occurs before the write. Preferably, the dependency is handled by ensuring that the most recent matching outstanding transaction in the read queue (when the write request was received) is serviced prior to servicing the outstanding entry in the write queue.

Cell 815 of FIG. 8 describes the dependency required when a write to a specific DRAM 113 memory location occurs before a Coherency request to the same specific DRAM 113 memory location. In this case, the write should occur prior to the coherency. Preferably, the dependency is handled by ensuring that the most recent matching outstanding transaction in the write queue (when the coherency request was received) is serviced prior to servicing the outstanding entry in the coherency queue.

Cell 816 of FIG. 8 shows the reversed situation. In Cell 816, an outstanding coherency transaction for a specific DRAM 113 memory address is received before an outstanding transaction to write to the same specific DRAM 113 memory address. In this case, the priority which ensures that the coherency transaction will occur prior to the write transaction ensures the proper sequencing of the transactions.

Cell 817 of FIG. 8 describes the dependency required when a write to a specific DRAM 113 memory location occurs before an EvictQ request to the same specific DRAM 113 memory location. In this case, the write should occur prior to the evict. Preferably, the dependency is handled by ensuring that the most recent matching outstanding transaction in the write queue (when the evict request was received) is serviced prior to servicing the outstanding entry in the evict queue.

Cell 818 of FIG. 8 shows the reversed situation. In Cell 818, an outstanding evict transaction for a specific DRAM 113 memory address is received before an outstanding transaction to write to the same specific DRAM 113 memory address. In this case, the evict transaction should occur prior to the write transaction to ensure the cache line currently in the DRAM 113 location is not overwritten by the write transaction. The dependency is handled by ensuring that the most recent matching outstanding transaction in the evict queue (when the write request was received) is serviced prior to servicing the outstanding entry on the write queue.

The need for dependency between an operation which was first requested for a specified memory location and a second requested operation on the same memory location has been described in detail. For purposes of the present illustration, the complete set of dependencies can be created by comparing the address of an incoming transaction with the address of every valid transaction waiting in the queue. Each address match is represented by a one or other suitable flag. The match bits are then concatenated together starting with slot 8 match bit and ending with the slot 1 match bit. For the example in FIG. 7C, where slot 3 and slot 5 have matches this creates an original match bit string of 00010100.

FIG. 9 shows the steps required to find the most significant or youngest match bit. Original match bits or vector is created by comparing an address of an incoming transaction with the address of each pending transaction. The Q insertion pointer is 3, which tells us that the youngest read Q entry is slot 3, the next youngest is slot 2, then slots 1, 8, 7, 6, 5, and 4. To normalize the original match bits so they are in youngest to oldest order, we need to do a right rotate by the amount of the Q insertion pointer. Next, clear mask 903 is applied which consists of zeros for each bit, starting at bit zero, to and including the first matched bit, and then consists of ones for each remaining bit.

FIG. 10 is a schematic diagram of a logic circuit configured to create clear mask 903. Right shifted bits 902 are received by the circuit in order where RS[0] is the first bit of right shifted bit 902. In this example, bit [0] of right shifted bit is 0, and the first bit of the clear mask is 0 (CM[0]) 1002. Both bit [0] and bit [1] of right shifted bits 902 are present at the inputs of OR gate 1003 when combined produces a 1 for bit [2] of clear mask bit 903. Similarly, each succeeding bit of clear mask 903 is generated. Note that, although creation of the clear mask is shown implemented in hardware, software and firmware implementations may be employed instead.

Once clear mask 903 is generated, its bits are inverted and combined through an AND function with right shifted bits 902 to produce Applied Mask 904. The result of the calculation of clear mask 903 and ANDing the inverse of clear mask 903 with right shifted bits 902 is to eliminate all appearances of "1" in right shifted bits other than the first appearance. Applied mask 904 is then reverse shifted (shifted to the left the same amount the original right shifted bits 902 were shifted to the right) to determine the answer. The answer indicates which bit, or which entry in the queue, the current queue entry is dependent on. In other words, which queue entry must be performed before this request is allowed to be completed.

FIG. 11 shows a preferred method to determine the dependency. FIG. 11 begins with the same original match bits and counter value as FIG. 9. Duplicate match bits 1101, also called an extended match vector, are generated by duplicating the original eight bits and concatenating them, to form a sixteen bit string 0010 1000 0010 1000.

Counter mask 1102 is generated from the counter value using combinational logic. As shown in Table 1, for each counter value a different counter mask will be generated. Using an eight entry queue with its associated CAMs will require eight different counter values.

TABLE 1

| Counter | Counter Mask |
|---------|--------------|
| 000 | 0111 1111 |
| 001 | 0011 1111 |
| 010 | 0001 1111 |
| 011 | 0000 1111 |
| 100 | 0000 0111 |
| 101 | 0000 0011 |
| 110 | 0000 0001 |
| 111 | 0000 0000 |

The counter mask values identified in Table 1 show the values for the first eight bits of counter mask 1102. The remaining eight bits are the inverse of the first eight bits. In other words, the rightmost eight bits are equal to an inverted copy of the leftmost eight bits.

Masked match bits 1103 is determined by ANDing duplicate match bits 1101 and counter mask 1102. As shown in FIG. 11, starting from rightmost bit (0) only bits 4 and 10 contain a "1" in both duplicate match bits 1101 and counter mask 1102.

A preferred implementation of generating clear mask 1104 can be implemented using circuitry similar to the circuitry described with reference to FIG. 10. Bit [0] of clear mask 903 is 0. In this example, bit [0] of masked bits 1103 is inputted to an ORing function which results in bit [1] of clear mask 1104 also being 0. The succeeding bits of clear mask 903 remain at 0 until a bit of masked match bits 1103 is equal to 1. Once this occurs the corresponding bit of the clear mask are equal to one. In a preferred embodiment, the bits of clear mask 1104 remaining after bits in counter mask 1102 transition from 1 to 0 do not need to be determined, but are preferably all set to 1.

Applied mask 1105 is determined by inverting the bits contained in clear mask 1104 and ANDing the result with masked match bits 1103. Once this is performed the second eight bits are ORed with the first eight bits.

FIG. 12 shows a flow chart which described the steps associated with the identification of the dependency of FIG. 11. In Step 1401 the original match bits are received and used to generate the duplicate match value. In Step 1402 the counter value is used to generate the counter mask. The counter mask may be generated in advance as a function of the various possible counter values. In Step 1403 masked match bits 1103 are generated by ANDing duplicate match bits 1101 with counter mask 1102. In Step 1404 clear mask 1104 is generated. In Step 1405 Applied Masked 1105 is generated by inverting clear mask 1104 and ANDing the resulting values with masked match bits 1103. The dependency is then determined in Step 1406 by ORing the first eight bits, in our example, with the second set of eight bits.

What is claimed is:

1. A method of providing ordered access to a memory, comprising the steps of:

comparing an address of an incoming transaction with the address of each pending transaction to create an original match vector indicating sequencing requirements between said incoming transaction and said pending transactions, said original match vector including a bit corresponding to a result of each comparison;

forming an image of said original match vector and concatenating said image of said original match vector with said original match vector to form an extended match vector;

receiving a value which indicates the relative age of said pending transaction;

generating a counter mask from said value;

generating masked match bits with a logic operation on said extended match vector and said counter mask;

identifying one of said masked match bits based on a predetermined criteria;

setting remaining ones of said match bits to a first predetermined logic value to provide an applied mask; and logically combining a first segment of said applied mask with a second segment of said applied mask to identify at most one of said pending transactions required to be completed prior to allowing said incoming transaction to be processed.

2. The method of claim 1 wherein said address of said pending transaction and said address of said incoming transaction comprise portions of respective memory addresses.

3. The method of claim 1 wherein said image is a duplicate of said original match vector.

4. The method of claim 1 wherein the value is a counter value indicating a position of a rotating queue.

5. The method of claim 1 wherein said counter mask is generated using a look-up structure.

6. The method of claim 1 wherein said counter mask is generated using decoding logic.

7. The method of claim 1 wherein said logic operation is a logic AND operation.

8. The method of claim 1 wherein said predetermined criteria includes scanning said masked match bits in a predetermined direction to identify a first occurrence of a first bit having a second predetermined logic value opposite said first predetermined logic value.

9. The method of claim 1 wherein said memory is one of a register file, a cache, a main memory, a tape drive, or a disk storage.

10. A memory-access ordering apparatus comprising:

a comparator which compares an address of an incoming transaction with the address of each pending transaction and creates an original match vector indicating sequencing requirements between said incoming transaction and said pending transactions, said original match vector including a bit corresponding to a result of each comparison;

an extended match vector formed by concatenating an image of said original match vector with said original match vector;

a value which indicates the relative age of said pending transaction;

a counter mask generated from said value;

masked match bits generated with a logic operation on said extended match vector and said counter mask;

a predetermined criteria used to identify one of said masked match bits;

an applied mask formed by setting remaining ones of said match bits to a first predetermined logic value; and an identification of at most one of said pending transactions required to be completed prior to allowing said incoming transaction to be processed identified by logically combining a first segment of said applied mask with a second segment of said applied mask.

11. The apparatus of claim 10 wherein said address of said pending transaction and said address of said incoming transaction comprise portions of respective memory addresses.

12. The apparatus of claim 10 wherein said image is a duplicate of said original match vector.

13. The apparatus of claim 10 wherein the value is a counter value indicating a position of a rotating queue.

14. The apparatus of claim 10 wherein said counter mask is generated using a look-up structure.

15. The apparatus of claim 10 wherein said counter mask is generate using decoding logic.

16. The apparatus of claim 10 wherein said logic operation is a logic AND operation.

17. The apparatus of claim 10 wherein said predetermined criteria includes scanning said masked match bits in a predetermined direction to identify a first occurrence of a first bit having a second predetermined logic value opposite said first predetermined logic value.

18. The apparatus of claim 10 wherein said memory is one of a register file, a cache, a main memory, a tape drive, or a disk storage.

* * * * *

UNITED STATES PATENT AND TRADEMARK OFFICE
CERTIFICATE OF CORRECTION

PATENT NO. : 6,915,396 B2
APPLICATION NO. : 09/853738
DATED : July 5, 2005
INVENTOR(S) : Duane A Wiens et al.

It is certified that error appears in the above-identified patent and that said Letters Patent is hereby corrected as shown below:

In column 1, line 10, above "BACKGROUND"
insert                                     -- TECHNICAL FIELD
This invention relates generally to computer memory systems, and more specifically to memory control within a system to improve access time to data using memory. --.

Signed and Sealed this

Fourth Day of August, 2009

JOHN DOLL
*Acting Director of the United States Patent and Trademark Office*